United States Patent
Yamada

(10) Patent No.: US 10,026,370 B2
(45) Date of Patent: Jul. 17, 2018

(54) LIQUID CRYSTAL APPARATUS AND ELECTRONIC EQUIPMENT

(71) Applicant: Seiko Epson Corporation, Tokyo (JP)

(72) Inventor: Shuhei Yamada, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/202,229

(22) Filed: Jul. 5, 2016

(65) Prior Publication Data

US 2017/0124966 A1     May 4, 2017

(30) Foreign Application Priority Data

Nov. 2, 2015  (JP) .................................. 2015-215495

(51) Int. Cl.
  *G02F 1/1343*  (2006.01)
  *G02F 1/1339*  (2006.01)
  *G09G 3/36*  (2006.01)

(52) U.S. Cl.
  CPC ......... *G09G 3/3614* (2013.01); *G02F 1/1339* (2013.01); *G02F 1/134309* (2013.01); *G09G 3/3677* (2013.01); *G09G 3/3688* (2013.01); *G02F 2201/123* (2013.01); *G09G 2300/0413* (2013.01); *G09G 2320/0252* (2013.01)

(58) Field of Classification Search
  CPC .. G09G 3/3614; G09G 3/3677; G09G 3/3688; G09G 2300/0413; G09G 2320/0252; G02F 1/1339; G02F 1/134309; G02F 2201/123
  See application file for complete search history.

(56) References Cited

U.S. PATENT DOCUMENTS

| 2010/0218889 A1* | 9/2010 | Verschueren ......... G02F 1/1343 156/275.5 |
| 2011/0068334 A1* | 3/2011 | Yamazaki ........... H01L 27/1225 257/43 |
| 2014/0160413 A1* | 6/2014 | Nishida ................. G02F 1/1337 349/123 |

FOREIGN PATENT DOCUMENTS

| JP | 02-003086 A | 1/1990 |
| JP | 2004-303774 A | 10/2004 |
| JP | 2007-504488 A | 3/2007 |
| JP | 2007-279172 A | 10/2007 |
| JP | 2007-316119 A | 12/2007 |
| JP | 2011-222971 A | 11/2011 |
| JP | 2012-042872 A | 3/2012 |
| WO | WO-2005-022244 A | 3/2005 |

* cited by examiner

*Primary Examiner* — Nathanael R Briggs
(74) *Attorney, Agent, or Firm* — ALG Intellectual Property, LLC

(57) ABSTRACT

A liquid crystal apparatus includes a first substrate and a second substrate which are arranged opposite to each other and bonded with sealing material, a liquid crystal layer interposed between the first substrate and the second substrate, a pixel electrode provided in a display region of the first substrate, a counter electrode provided to oppose the pixel electrodes in the second substrate, and a peripheral electrode provided in the first substrate between the display region and the sealing material in plan view, in which a signal, which is an alternating potential which inverts a polarity with respect to a reference potential in a first period and which is the reference potential in a second period, is applied to the peripheral electrode.

20 Claims, 11 Drawing Sheets

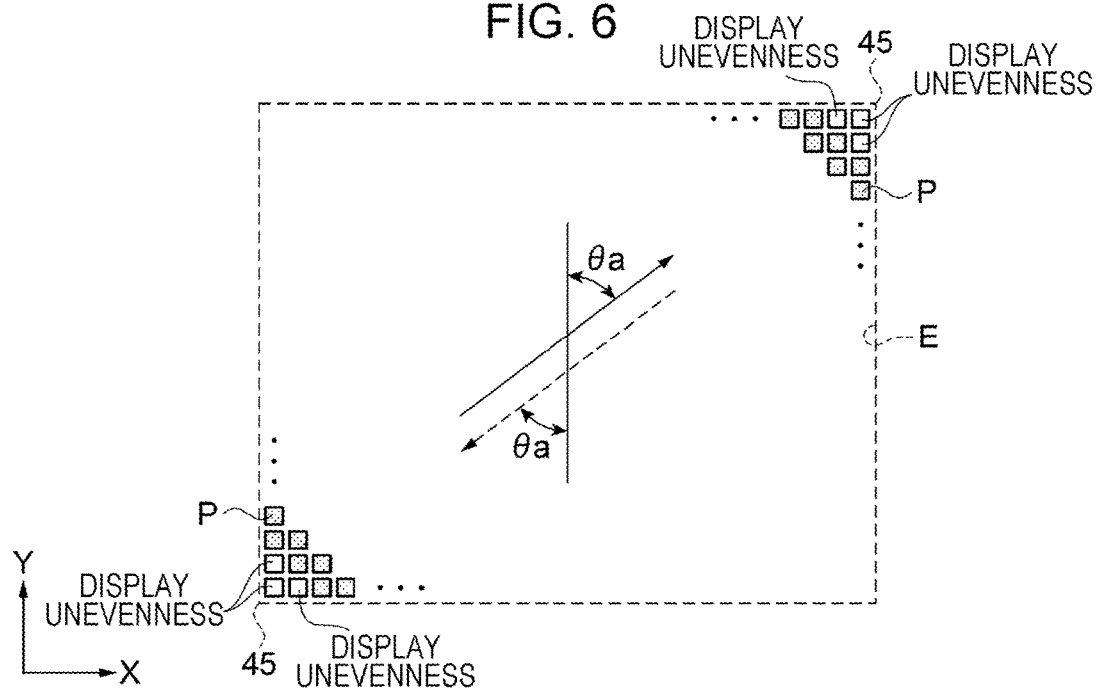
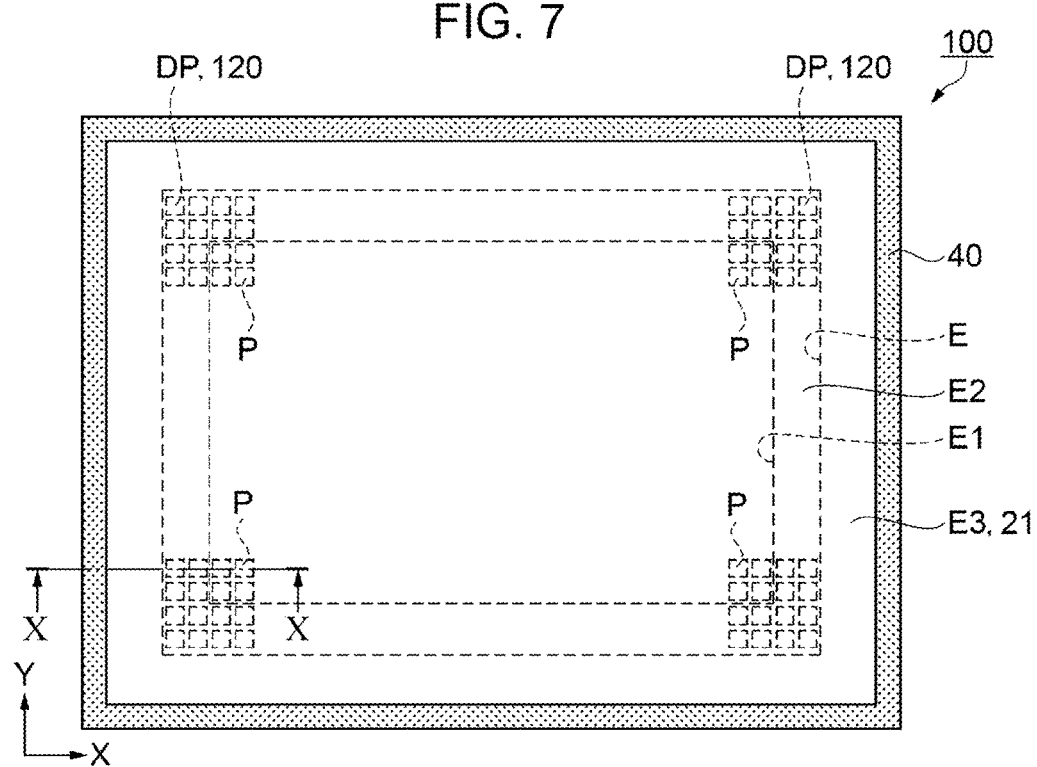

LIQUID CRYSTAL APPARATUS AND ELECTRONIC EQUIPMENT

BACKGROUND

1. Technical Field

The present invention relates to a liquid crystal apparatus and electronic equipment.

2. Related Art

A liquid crystal apparatus is provided with a liquid crystal panel in which a liquid crystal layer is interposed between a pair of substrates. When light is incident to such a liquid crystal apparatus, the liquid crystal material, alignment film, or the like which forms the liquid crystal panel undergoes a photochemical reaction due to the incident light and ionic impurities may be generated as a reaction product. In addition, it is known that ionic impurities also diffuse into the liquid crystal layer from sealing material or a sealant in the manufacturing process of the liquid crystal panel. In particular, in a liquid crystal apparatus used in an optical modulating means (light valve) of a projection-type display apparatus (projector), since the luminous flux density of the incident light is high in comparison with a direct-view-type liquid crystal apparatus, it is necessary to suppress the ionic impurities from influencing the display.

As a means for suppressing the influence of the ionic impurities on the display, for example, JP-T-2007-504488 proposes a liquid crystal display apparatus having an ion removal driving unit which removes ions from a liquid crystal layer in an STN system. A uniform electric field is created in the liquid crystal layer by applying a uniform alternating voltage to the electrodes of the ion removal driving unit of the liquid crystal display apparatus. JP-T-2007-504488 discloses that, as a result, the alignment direction (director) of the liquid crystal molecules in the liquid crystal layer changes and the ions move gradually toward the side in the liquid crystal layer in accordance with the changes in the director so as to be removed to the outside of the display region.

However, although a uniform alternating voltage is applied to the electrodes of the ion removal driving unit to remove the ions from the display region in the liquid crystal display apparatus described in JP-T-2007-504488, there is a concern that, depending on the method for applying the alternating voltage with respect to the electrodes, it will not be possible to apply a uniform alternating electric field to the liquid crystal layer due to the waveform of the alternating voltage being deteriorated.

In addition, in a case where, for example, a region to which the alternating electric field is not applied such as an electric parting is arranged in the liquid crystal layer, there is a concern that this region will block the movement of ionic impurities to the side since a uniform electric field is not easily created in this region.

From the above, there are problems in that the influence of the ionic impurities included in the liquid crystal layer on the display may not be sufficiently suppressed.

SUMMARY

The invention can be realized in the following aspects or application examples.

Application Example 1

A liquid crystal apparatus of this application example includes a first substrate and a second substrate which are arranged opposite to each other and bonded with sealing material, a liquid crystal layer interposed between the first substrate and the second substrate, a pixel electrode provided in a display region of the first substrate, a counter electrode provided to oppose the pixel electrode in the second substrate, and a peripheral electrode provided in the first substrate between the display region and the sealing material in plan view, in which a signal, which is an alternating potential which inverts a polarity with respect to a reference potential in a first period and which is the reference potential in a second period, is applied to the peripheral electrode.

According to the application example, the ionic impurities in the display region are moved to the region provided with the peripheral electrode by generating a liquid crystal flow in accordance with alignment changes in the liquid crystal molecules in the liquid crystal layer in the region provided with the peripheral electrode. Therefore, for example, even in a case where a region to which an alternating potential is not applied, such as an electric parting section, is arranged in the display region of the liquid crystal apparatus, it is possible to move the ionic impurities from the display region to the outside of the display region regardless of the polarity of the ionic impurities. Accordingly, it is possible to reduce the influence of burn-in or the like caused by the ionic impurities included in the liquid crystal layer on the display.

Application Example 2

In the liquid crystal apparatus according to the application example, the signal is periodically applied.

According to this configuration, it is possible to sweep the ionic impurities from the display region to the outside of the display region by generating a liquid crystal flow in accordance with periodic alignment changes in the liquid crystal molecules.

Application Example 3

In the liquid crystal apparatus according to the application example, the first period is shorter than the second period.

According to this configuration, it is possible to form a strong liquid crystal flow since it is possible to ensure sufficient time for the liquid crystal molecules to return to the initial alignment state in comparison with a case where the first period and the second period are equal or the first period is longer than the second period.

Application Example 4

In the liquid crystal apparatus according to the application example, the first substrate is provided with an electric parting section provided so as to surround the pixel electrodes.

According to this configuration, it is possible to reduce the influence of the ionic impurities moved to the region provided with the peripheral electrode on the display region by providing the electric parting section between the pixel electrode and the peripheral electrode.

Application Example 5

In the liquid crystal apparatus according to the application example, the reference potential is the same potential as a potential of the counter electrode.

According to this configuration, it is possible to suppress a direct current voltage from being applied to the liquid crystal layer due to the potential difference between the peripheral electrode and the counter electrode. Therefore, it is possible to reduce the deterioration of the liquid crystal layer.

Application Example 6

In the liquid crystal apparatus according to the application example, the first period is 1 msec or more to 100 msec or less.

According to this configuration, it is possible to reliably form a liquid crystal flow in the region provided with the peripheral electrode since it is possible to change the potential applied to the peripheral electrode to match the response speed of the liquid crystal.

Application Example 7

In the liquid crystal apparatus according to the application example, a potential difference between the reference potential and the alternating potential is 0.5 V or more.

According to this configuration, it is possible to form a stronger liquid crystal flow since the alignment changes in the liquid crystal are large in comparison with a case where the potential difference between the reference potential and the alternating potential is less than 0.5 V. Therefore, it is possible to efficiently sweep the ionic impurities from the display region to the outside of the display region.

Application Example 8

In the liquid crystal apparatus according to the application example, an amplitude of the alternating potential is greater than an amplitude of the potential applied to the pixel electrodes.

According to this configuration, it is possible to increase the speed of the alignment changes in the liquid crystal molecules. Therefore, it is possible to form a large liquid crystal flow by generating a high torque in the liquid crystal molecules. As a result, it is possible to efficiently sweep the ionic impurities from the display region to the outside of the display region.

Application Example 9

In the liquid crystal apparatus according to the application example, the alternating potential changes stepwise between three or more values over time.

According to this configuration, the liquid crystal flow is formed smoothly since the alternating potential changes gradually over time. Therefore, the alternating potential is more likely to match the response of the liquid crystal molecules.

Application Example 10

Electronic equipment according to this application example includes the liquid crystal apparatus described above.

According to the application example, it is possible to provide electronic equipment having an excellent display quality and for which display defects caused by ionic impurities are improved.

BRIEF DESCRIPTION OF THE DRAWINGS

The invention will be described with reference to the accompanying drawings, wherein like numbers reference like elements.

FIG. 6 is a schematic plan diagram which shows a relationship between an oblique deposition direction of inorganic material and display unevenness caused by ionic impurities.

FIG. 7 is a schematic plan diagram which shows an arrangement of pixels contributing to a display and dummy pixels.

DESCRIPTION OF EXEMPLARY EMBODIMENTS

Description will be given below of embodiments embodying the invention with reference to the accompanying drawings. Here, in each of the following diagrams, each of the constituent elements is set to a size which is recognizable in the diagram and the scale of each of the constituent elements may be illustrated with a scale different from reality for convenience of description.

First Embodiment

In the present embodiment, description will be given of an active matrix-type liquid crystal apparatus provided with a thin film transistor (TFT) as a pixel switching element as an example. It is possible for this liquid crystal apparatus to be suitably used as, for example, an optical modulation means (liquid crystal light valve) of a projection-type display apparatus (liquid crystal projector) to be described below.

Configuration of Liquid Crystal Apparatus

Figure 1:
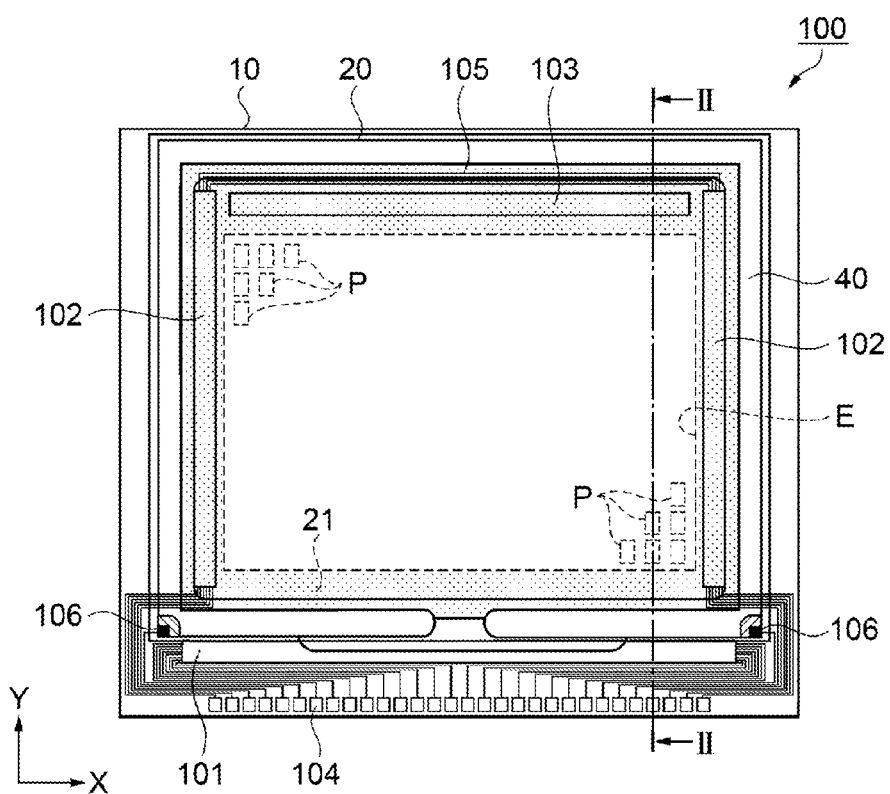
FIG. 1 is a schematic plan diagram which shows a configuration of a liquid crystal apparatus according to a first embodiment.
Figure 2:
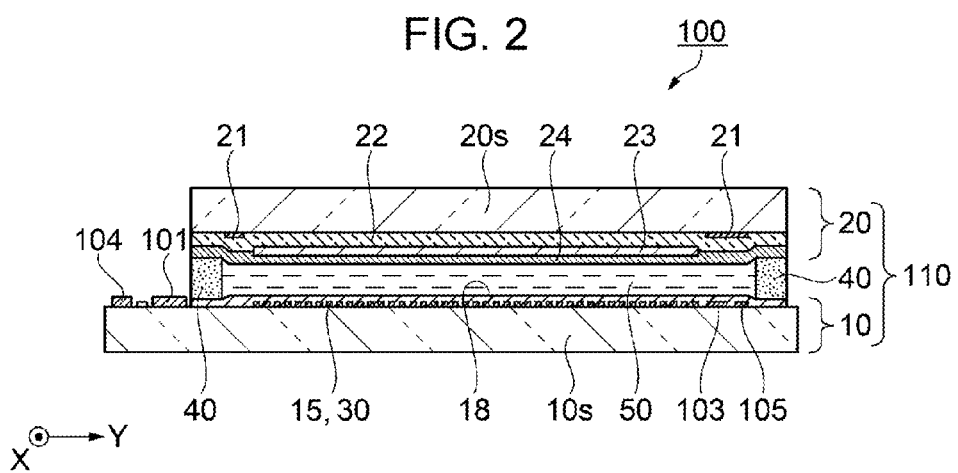
FIG. 2 is a schematic cross-sectional diagram taken along a line II-II of the liquid crystal apparatus which is shown in FIG. 1.

FIG. 1 is a schematic plan diagram which shows a configuration of a liquid crystal apparatus according to a first embodiment and FIG. 2 is a schematic cross-sectional diagram taken along a line II-II of the liquid crystal apparatus which is shown in FIG. 1. First, description will be given of the liquid crystal apparatus according to the present embodiment with reference to FIG. 1 and FIG. 2.

As shown in FIG. 1 and FIG. 2, a liquid crystal apparatus 100 according to the present embodiment has an element substrate 10 and a counter substrate 20 arranged to oppose each other, and a liquid crystal layer 50 interposed between the pair of substrates. For a base material 10s of the element substrate 10 and a base material 20s of the counter substrate 20, it is possible to use, for example, a quartz substrate or a glass substrate, which are transparent. The element substrate 10 corresponds to the first substrate of the invention and the counter substrate 20 corresponds to the second substrate of the invention.

The element substrate 10 is larger than the counter substrate 20, both substrates are bonded at an interval via sealing material 40 arranged along the outer edge of the counter substrate 20, and the liquid crystal layer 50 is formed by sealing liquid crystal having positive or negative dielectric anisotropy in the interval.

As the sealing material 40, for example, an adhesive such as a thermosetting or ultraviolet curable epoxy resin is adopted. Spacers (not shown) for maintaining the interval described above between the pair of substrates to be constant are incorporated into the sealing material 40.

A display region E which includes a plurality of pixels P arranged in a matrix is provided inside the sealing material 40. In addition, a parting section 21 surrounding the display region E is provided between the sealing material 40 and the display region E. The parting section 21 is composed of a light-shielding metal, an alloy or a metal oxide of such a metal, or the like. Here, dummy pixels may be provided in the display region E so as to surround the plurality of pixels P which contribute to the display.

The element substrate 10 is provided with terminal sections in which a plurality of external connection terminals 104 are arranged. A data line driving circuit 101 is provided between a first side section along the terminal section and the sealing material 40. In addition, a test circuit 103 is provided between the sealing material 40 along a second side section which opposes the first side section, and the display region E.

Furthermore, a scanning line driving circuit 102 is provided between the sealing material 40 along third and fourth side sections which are perpendicular to the first side section and which oppose each other, and the display region E. A plurality of wirings 105 connecting two of the scanning line driving circuits 102 are provided between the sealing material 40 on the second side section and the test circuit 103.

The wiring connecting these data line driving circuits 101 and scanning line driving circuits 102 is connected to a plurality of the external connection terminals 104 arranged along the first side section.

Below, description will be given in which the direction along the first side section is the X direction and the direction along the third side section is the Y direction. Here, the arrangement of the test circuit 103 is not limited thereto and the test circuit 103 may be provided at positions along the inside of the sealing material 40 between the data line driving circuits 101 and the display region E.

As shown in FIG. 2, transparent pixel electrodes 15 provided for each pixel P and a thin film transistor 30 (referred to below as the TFT 30), which is a switching element, signal wiring (not shown), and an alignment film 18 covering the above are formed on the liquid crystal layer 50 side surface of the element substrate 10.

The element substrate 10 includes the base material 10s, the pixel electrodes 15 formed on the base material 10s, the TFT 30, signal wiring (not shown), and the alignment film 18.

The counter substrate 20 which is arranged to oppose the element substrate 10 includes the base material 20s, the parting section 21 formed on the base material 20s, a planarizing layer 22 forming a film so as to cover the above, a common electrode 23 which covers the planarizing layer 22 and which is provided along at least the display region E, and an alignment film 24 which covers the common electrode 23. In the invention, the common electrode 23 corresponds to the counter electrode.

In addition, the liquid crystal apparatus 100 adopts a light-shielding structure which prevents the switching operation becoming unstable due to light being incident to the semiconductor layer in the TFT 30. Specifically, the parting section 21 surrounds the display region E and is provided at a position overlapping with the scanning line driving circuits 102 and the test circuit 103 in plan view.

Due to this, the parting section 21 fulfils a role of preventing these circuits from malfunctioning due to the light by shielding the light incident to these circuits from the side of the counter substrate 20. The parting section 21 ensures a high contrast in the display of the display region E by shielding unnecessary stray light from being incident to the display region E.

The planarizing layer 22 is composed of, for example, an inorganic material such as silicon oxide and is provided so as to cover the parting section 21 which has a light transmitting property. Examples of methods for forming the planarizing layer 22 include methods for forming films using a plasma chemical vapor deposition method or the like.

The common electrode 23 is, for example, composed of a transparent conductive film of indium tin oxide (ITO) or the like, covers the planarizing layer 22, and is electrically connected with a vertical conducting section 106 which is provided in the corner on the lower side of the counter substrate 20. The vertical conducting section 106 is electrically connected to wiring on the element substrate 10 side.

The alignment film 18 which covers the pixel electrodes 15 and the alignment film 24 which covers the common electrode 23 are selected based on the optical design of the liquid crystal apparatus 100. Examples of the alignment films 18 and 24 include organic alignment films on which a substantially horizontal alignment process is carried out with respect to liquid crystal molecules having positive dielectric anisotropy by forming films of organic material such as polyimide and rubbing the surfaces thereof, and inorganic alignment films substantially vertically aligned with respect to liquid crystal molecules having negative dielectric anisotropy by forming films of inorganic material such as SiOx (silicon oxide) using a vapor deposition method.

In the present embodiment, the alignment films 18 and 24 are composed of aggregates of columns in which an inorganic material such as silicon oxide is grown in a columnar shape from a predetermined direction, for example, by oblique evaporation. The liquid crystal molecules having negative dielectric anisotropy with respect to these alignment films 18 and 24 are substantially vertically aligned (vertical alignment: VA) with a pre-tilt angle of 3 degrees to 5 degrees in the inclination direction of the column with respect to the normal direction of the alignment film surface.

By applying a voltage (driving signal) between the pixel electrodes 15 and the common electrode 23 to drive the liquid crystal layer 50, the liquid crystal molecules behave (vibrate) so as to incline in the direction of the electric field generated between the pixel electrodes 15 and the common electrode 23.

The liquid crystal apparatus 100 is a transmission type and adopts an optical design which has a normally white mode in which the transmittance of the pixels P is the maximum in a state where no voltage is applied or a normally black mode in which the transmittance of the pixels P is the minimum in a state where no voltage is applied. Each polarizing element is used by being arranged according to the optical design on the light incident side and emission side of a liquid crystal panel 110 including the element substrate 10 and the counter substrate 20.

In the present embodiment, description will be given below of an example to which an optical design with a normally black mode is applied and liquid crystal having the inorganic alignment film and negative dielectric anisotropy described above is used as the alignment films 18 and 24.

Figure 3:
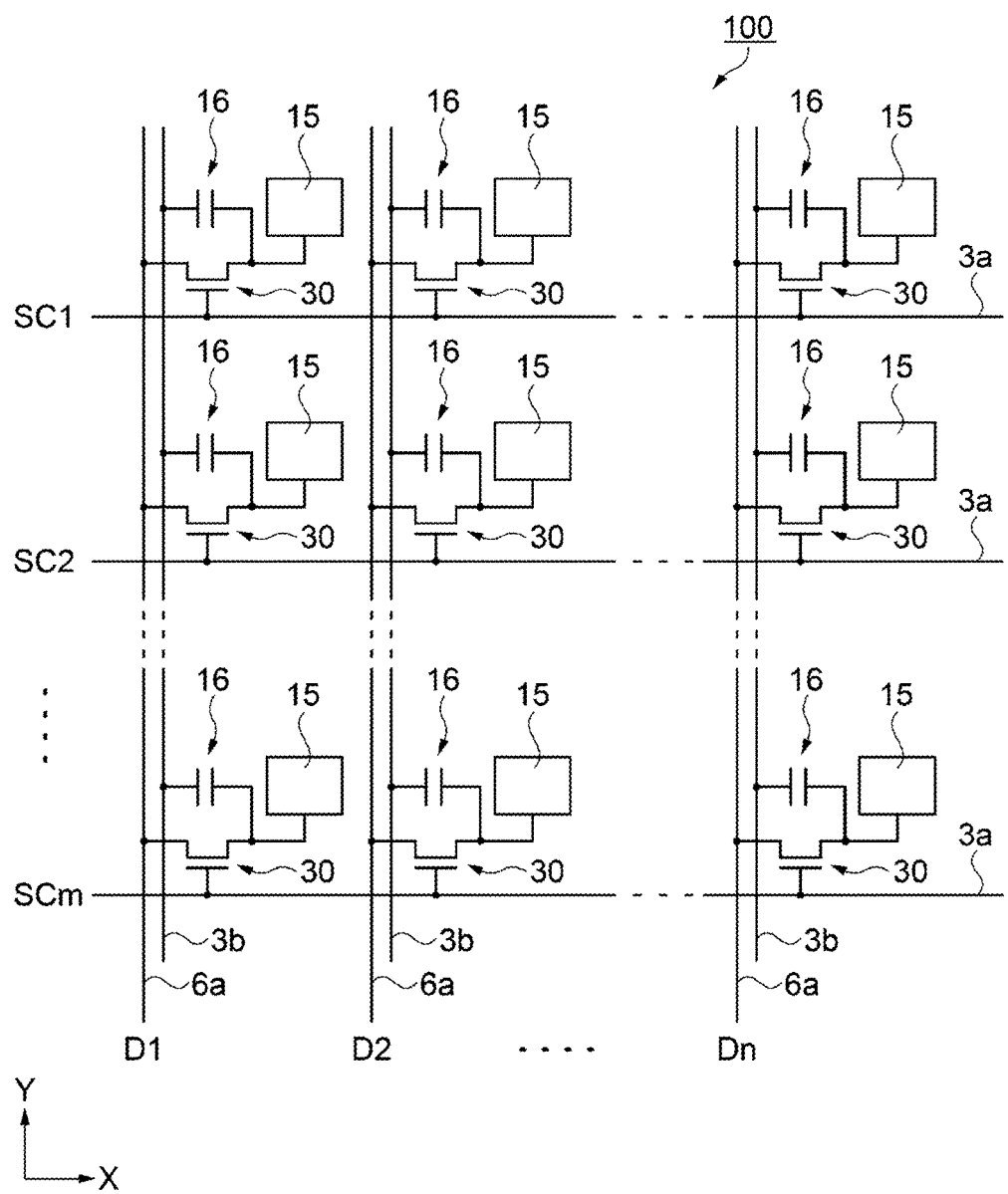
FIG. 3 is an equivalent circuit diagram which shows an electrical configuration of the liquid crystal apparatus.

FIG. 3 is an equivalent circuit diagram which shows the electrical configuration of the liquid crystal apparatus. Referring to FIG. 3, description will be given of the electrical configuration of the liquid crystal apparatus 100. The liquid crystal apparatus 100 has a plurality of scanning lines 3a and a plurality of data lines 6a as signal wirings perpendicular and insulated from each other in at least the display region E and capacitor lines 3b arranged in parallel along the data lines 6a. The direction in which the scanning lines 3a extend is the X direction and the direction in which the data lines 6a extend is the Y direction.

The pixel electrodes 15, the TFT 30, and a storage capacitor 16 are provided in regions which are partitioned according to the scanning lines 3a, the data lines 6a, and the capacitor lines 3b, and the type of these signal lines, and the above form the pixel circuit of the pixel P.

The scanning lines 3a are electrically connected with gates of the TFT 30 and the data lines 6a are electrically connected with the sources of the TFT 30. The pixel electrodes 15 are electrically connected with drains of the TFT 30.

The data lines 6a are connected with a data line driving circuit 101 (refer to FIG. 1 and FIG. 2) and image signals D1, D2, ... Dn supplied from the data line driving circuit 101 are supplied to the pixels P. The scanning lines 3a are connected with a scanning line driving circuit 102 (refer to FIG. 1) and scanning signals SC1, SC2, ... SCm, supplied from the scanning line driving circuit 102 are supplied to the pixels P.

The image signals D1 to Dn supplied from the data line driving circuit 101 to the data lines 6a may be supplied line-sequentially in this order, or may be supplied to each group with respect to a plurality of the data lines 6a adjacent to each other. The scanning line driving circuit 102 supplies the scanning signals SC1 to SCm line-sequentially in pulses at a predetermined timing with respect to the scanning lines 3a.

The liquid crystal apparatus 100 has a configuration in which the TFT 30 which is a switching element is set to an on state by the input of the scanning signals SC1 to SCm only at certain period, such that the image signals D1 to Dn supplied from the data lines 6a are written to the pixel electrodes 15 at a predetermined timing.

Then, the image signals D1 to Dn of a predetermined level written to the liquid crystal layer 50 via the pixel electrodes 15 are held for a set period between the pixel electrodes 15 and the common electrode 23 arranged to oppose each other via the liquid crystal layer 50. The frequency of the image signals D1 to Dn is, for example, 60 Hz.

In order to prevent the held image signals D1 to Dn from leaking, the storage capacitors 16 are connected in parallel with a liquid crystal capacitor formed between the pixel electrodes 15 and the common electrode 23. The storage capacitors 16 are provided between the drain of the TFT 30 and the capacitor lines 3b.

The data lines 6a are connected with the test circuit 103 shown in FIG. 1 and have a configuration in which it is possible to confirm operation defects or the like in the liquid crystal apparatus 100 in the manufacturing process of the liquid crystal apparatus 100 by detecting the image signals described above; however, illustration is omitted in the equivalent circuit in FIG. 3.

Peripheral circuits for driving and controlling the pixel circuit according to the present embodiment include the data line driving circuit 101, the scanning line driving circuit 102, and the test circuit 103. In addition, the peripheral circuit may include a sampling circuit which samples the image signals described above and supplies the results to the data lines 6a, and a pre-charge circuit which supplies a pre-charge signal with a predetermined voltage level to the data lines 6a in advance of the image signals described above.

Alignment State of Liquid Crystal Molecules

Figure 4:
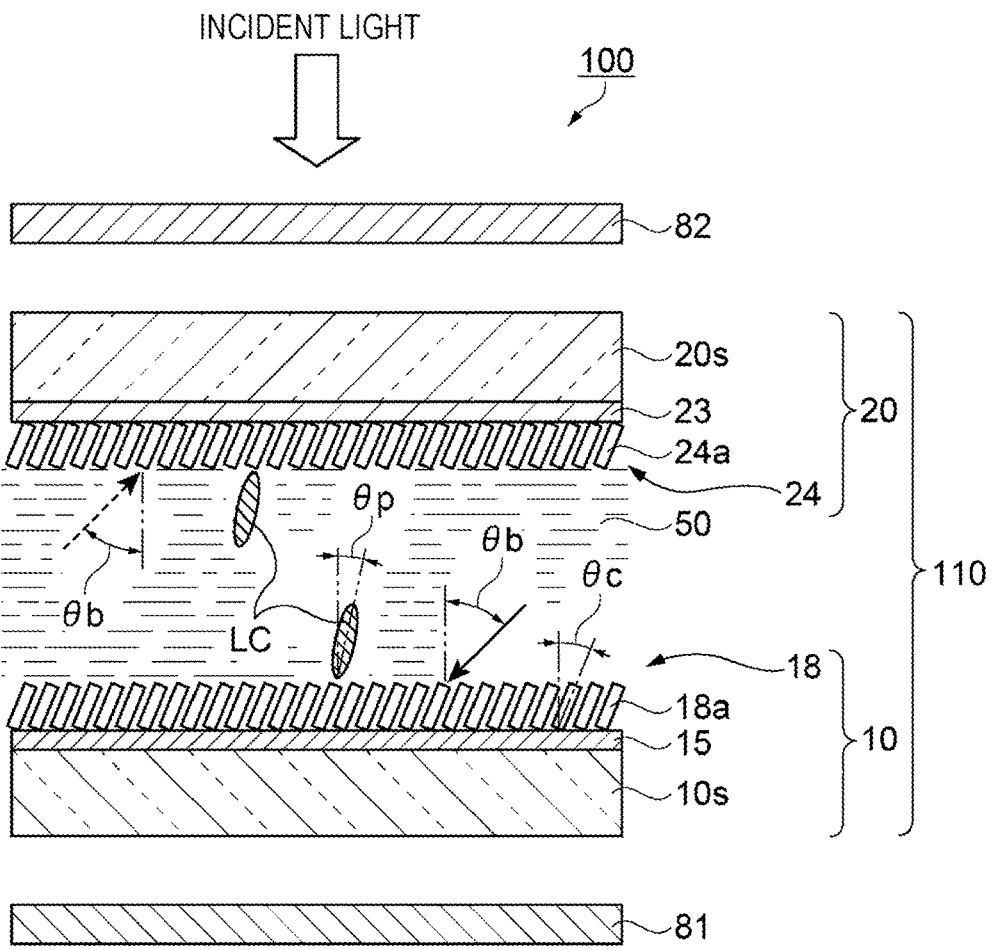
FIG. 4 is a schematic cross-sectional diagram which shows a forming state of an inorganic alignment film and an alignment state of liquid crystal molecules in the liquid crystal apparatus.
Figure 5:
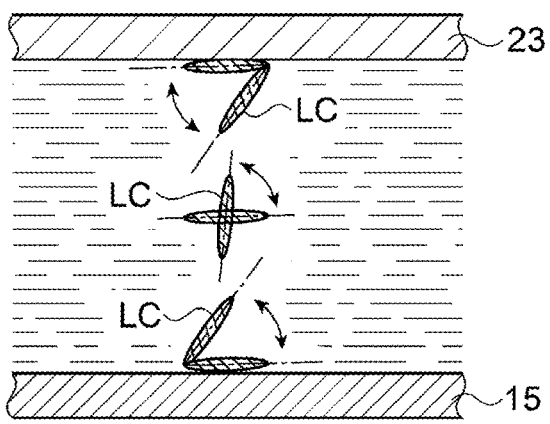
FIG. 5 is a schematic cross-sectional diagram which shows activity of the liquid crystal molecules.

Next, description will be given of the alignment state of the liquid crystal molecules in the liquid crystal apparatus 100 with reference to FIG. 4 and FIG. 5. FIG. 4 is a schematic cross-sectional diagram which shows the forming state of an inorganic alignment film and the alignment state of liquid crystal molecules in the liquid crystal apparatus and FIG. 5 is a schematic cross-sectional diagram which shows the activity of the liquid crystal molecules.

As shown in FIG. 4, the alignment film 18 and the alignment film 24 obtained by oblique evaporation of silicon oxide using a vacuum deposition method, which is an example of a physical vapor deposition method, are formed on the surfaces of the pixel electrodes 15 and the common electrode 23 in the liquid crystal apparatus 100. Specifically, the deposition angle θb with respect to the normal line of the substrate surfaces of the element substrate 10 and the counter substrate 20 facing the liquid crystal layer 50 is approximately 45 degrees.

By this oblique deposition, the silicon oxide grows in a columnar shape in the deposition direction on the substrate surface. These columnar structures are referred to as columns 18a and 24a. The alignment films 18 and 24 are aggregates of the columns 18a and 24a.

An angle θc of the growth direction of the columns 18a and 24a with respect to the normal line of the substrate surface does not necessarily coincide with the deposition angle θb and is approximately 20 degrees in this case. On the surfaces of the alignment films 18 and 24, a pre-tilt angle θp of vertically aligned liquid crystal molecules LC is approximately 3 degrees to 5 degrees.

In addition, the pre-tilt direction of the inclination of the liquid crystal molecules LC viewed from the normal direction of the substrate surface, that is, the inclination direction of the liquid crystal molecules LC, is the same as the planar deposition direction of the oblique deposition in the alignment films 18 and 24. The above-described inclination direction of the vertical alignment process is set as appropriate based on the optical design conditions of the liquid crystal apparatus 100.

In this manner, an alignment state where the liquid crystal molecules LC having negative dielectric anisotropy with respect to the alignment film surfaces are given a pre-tilt angle θp and inverted is referred to as a substantially vertical alignment.

The panel including the element substrate 10 and the counter substrate 20 which are arranged to oppose each other and the liquid crystal layer 50 interposed between the pair of substrates is referred to as the liquid crystal panel 110. The liquid crystal apparatus 100 is provided with polarizing elements 81 and 82 respectively arranged on the light incident side and emission side of the liquid crystal panel 110.

In addition, the polarizing elements 81 and 82 are respectively arranged with respect to the liquid crystal panel 110 such that, in the polarizing elements 81 and 82, one of the transmission axis or absorption axis is parallel with respect to the X direction or the Y direction and the transmission axes or absorption axes are perpendicular to each other.

The incident direction of light to the liquid crystal panel 110 is not limited to being incident from the counter substrate 20 side. In addition, a configuration may be adopted in which an optical compensating element, such as a retardation plate is provided on the incident side or emission side of the light.

In the present embodiment, a substantially vertical alignment process is carried out such that the azimuth angle of the pre-tilt of the liquid crystal molecules LC intersects at 45 degrees with respect to the transmission axes or absorption axes of the polarizing elements 81 and 82 in the display region E. Accordingly, as shown in FIG. 5, when the liquid crystal layer 50 is driven by applying a driving voltage between the pixel electrodes 15 and the common electrode 23, the liquid crystal molecules LC fall in the inclination direction of the pre-tilt to make an optical arrangement which obtains a high transmittance.

When the driving (ON/OFF) of the liquid crystal layer 50 is repeated, the liquid crystal molecules LC repeat the activity of falling in the inclination direction of the pre-tilt and returning to the initial alignment state. In this manner, the substantially vertical alignment process in which the activity of the liquid crystal molecules LC occurs is referred to as a single-axis substantially vertical alignment process.
Display Unevenness Due to Ionic Impurities Next, with reference to FIG. 6, description will be given of display unevenness caused by ionic impurities which the invention aims to solve. FIG. 6 is a schematic plan diagram which shows a relationship between the oblique deposition direction of the inorganic material and the display unevenness caused by the ionic impurities.

The oblique deposition direction of the inorganic material which forms the columns 18a and 24a is, for example, a direction which intersects with the Y direction at a predetermined azimuth angle θa from the top right to the bottom left on the side of the element substrate 10 as shown by the arrow with the dashed line as shown in FIG. 6.

On the side of the counter substrate 20 which is arranged to oppose the element substrate 10, as shown by the arrow with the solid line, the oblique deposition direction is a direction which intersects with the Y direction at a predetermined azimuth angle θa from the bottom left to the top right. The predetermined azimuth angle θa is, for example, 45 degrees. Here, the oblique deposition direction shown in FIG. 6 is the direction when the liquid crystal panel 110 is seen from the counter substrate 20 side.

For example, in the case of a normally black mode, activity (vibration) is generated in the liquid crystal molecules LC by driving the liquid crystal layer 50 and the flow of the liquid crystal molecules LC is generated in the oblique deposition direction shown by the dashed line or solid line arrows shown in FIG. 6 in the vicinity of the interface between the liquid crystal layer 50 and the alignment film 18 and 24. Assuming that ionic impurities of which the polarity is positive or negative are included in the liquid crystal layer 50, there is a concern that the ionic impurities will be moved and unevenly distributed toward the corner sections 45 of the display region E along with the flow of the liquid crystal molecules LC.

In the pixels P positioned around the corner sections 45 of the display region E, when the insulation resistance of the liquid crystal layer 50 is decreased due to the uneven distribution of ionic impurities, a decrease in the driving potential is caused and display unevenness or the burn-in phenomenon due to the energization is remarkable as shown in FIG. 6. In particular, in a case of using inorganic alignment films as the alignment films 18 and 24, the display unevenness and the burn-in phenomenon tend to stand out in comparison with organic alignment films since the inorganic alignment films easily adsorb ionic impurities. FIG. 6 shows a state where light leakage occurs in three of the pixels P positioned around the corner sections 45 of the display region E.

The azimuth angle θa may be 45 degrees down and to the right as well as 45 degrees up and to the right as shown in FIG. 6. In such a case, display unevenness is generated around the corner sections 45 at the top left and the bottom right in the display region E. In other words, the azimuth angle θa of the liquid crystal molecules LC when the driving voltage is supplied to the liquid crystal layer 50 is the flow direction of the liquid crystal molecules LC.

Since the thickness of the liquid crystal layer 50 is approximately 1 μm to 3 μm depending on the optical design conditions of the liquid crystal panel 110, the flow of the liquid crystal molecules LC is strongly generated in the vicinity of the alignment film surfaces of each of the alignment films 18 and 24. Thus, the flow direction of the liquid crystal molecules LC is reversed between the element substrate 10 side and the counter substrate 20 side.

Figure 8:
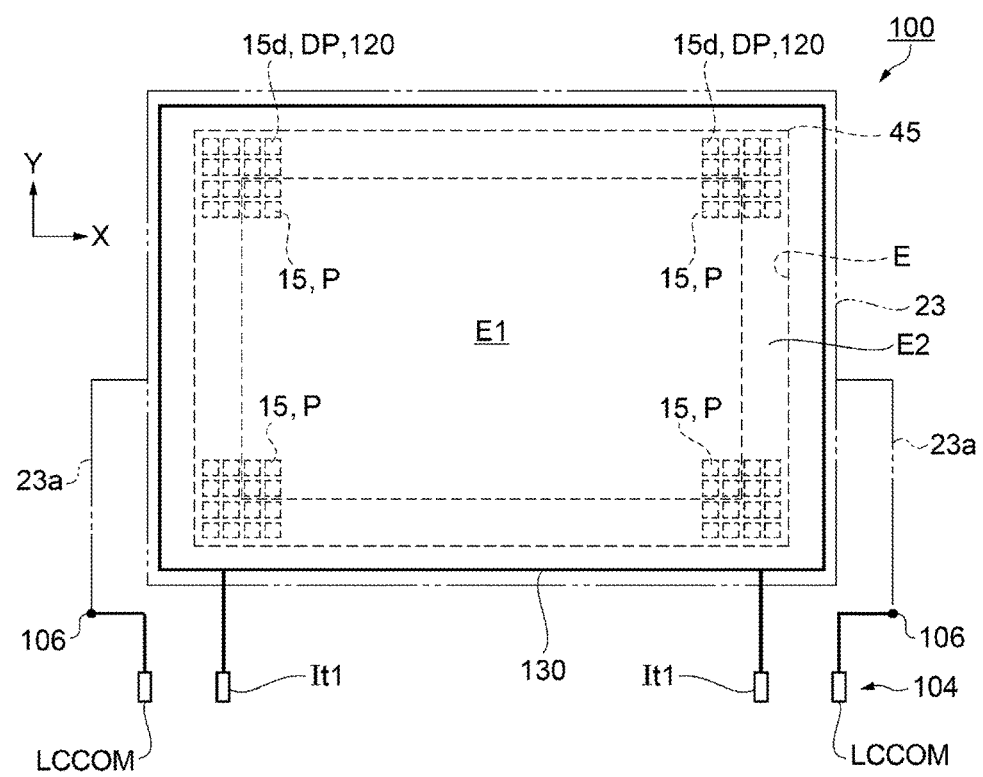
FIG. 8 is a wiring diagram of an electric parting section and an ion sweeping mechanism.

In the liquid crystal apparatus 100 according to the present embodiment, an ion sweeping mechanism for sweeping ionic impurities from the display region E is provided between the sealing material 40 and the display region E in order to improve the display unevenness and the burn-in phenomenon. Below, description will be given of the ion sweeping mechanism according to the present embodiment with reference to FIG. 7 and FIG. 8.
Ion Sweeping Mechanism FIG. 7 is a schematic plan diagram which shows the arrangement of pixels which contribute to the display and the dummy pixels and FIG. 8 is a wiring diagram of an electric parting section and an ion sweeping mechanism.

As shown in FIG. 7, the display region E of the liquid crystal apparatus 100 according to the present embodiment includes an actual display region E1 in which a plurality of the pixels P which contribute to the display are arranged, and a dummy pixel region E2 having a plurality of dummy pixels DP provided to surround the actual display region E1.

The parting section 21 having the light-shielding property described above is provided between a region in which the sealing material 40 is arranged in a frame shape and the dummy pixel region E2, and the region in which the parting section 21 is provided is a parting region E3 which is independent of the ON or OFF of the liquid crystal apparatus 100.

In the dummy pixel region E2, dummy pixels DP are arranged two at a time in the X direction to interpose the actual display region E1 and dummy pixels DP are arranged two at a time in the Y direction to interpose the actual display region E1. Here, the number of dummy pixels DP arranged in the dummy pixel region E2 is not limited thereto, and the dummy pixels DP may be arranged at least one at a time to interpose the actual display region E1 in each of the X direction and the Y direction.

In addition, the dummy pixels DP may be arranged three or more at a time, or the numbers arranged in the X direction and the Y direction may be different. In the present embodiment, since the dummy pixels DP function as an electric parting section, the reference numeral 120 is applied to the plurality of dummy pixels DP and the dummy pixels DP may be referred to as the electric parting section 120.

As shown in FIG. 8, the ion sweeping mechanism according to the present embodiment is provided with a peripheral electrode 130 provided in a ring-shape (a frame shape) so as to surround the display region E. The peripheral electrode 130 is not limited to being a single electrode and a plurality thereof may be arranged.

The ion sweeping mechanism sweeps the ionic impurities which are unevenly distributed around the corner sections 45 of the display region E by the peripheral electrode 130 to the outside of the display region E. The peripheral electrode 130 is electrically connected to the external connection terminal 104 (It1) to which the first potential is supplied as an ion sweeping signal. In addition, a plurality of dummy pixels DP arranged so as to surround the actual display region E1 have dummy pixel electrodes 15d along the edge of the actual display region E1.

Among the plurality of external connection terminals 104, the external connection terminals 104 provided on both end sides in the X axis direction are electrically connected with the vertical conducting section 106. The common electrode 23 is electrically connected with the vertical conducting section 106 via wiring 23a in the same manner. The external connection terminal 104 (LCCOM) is supplied with a common potential (may be referred to below as LCCOM). That is, a common potential (LCCOM) is applied to the common electrode 23.

In the present embodiment, a configuration is adopted in which a potential is supplied from two external connection terminals 104 (It1) in order to reduce the variation in the potential supplied to the peripheral electrodes 130 due to the position of the peripheral electrode 130 on the element substrate 10; however, the invention is not limited thereto. In other words, one of the external connection terminals 104 (It1) may be arranged, or three or more may be arranged.

In addition, the peripheral electrode 130 may be in a state (open) where lead wiring is connected with one end and the other end is opened.

Method for Driving Liquid Crystal Apparatus

Figure 9:
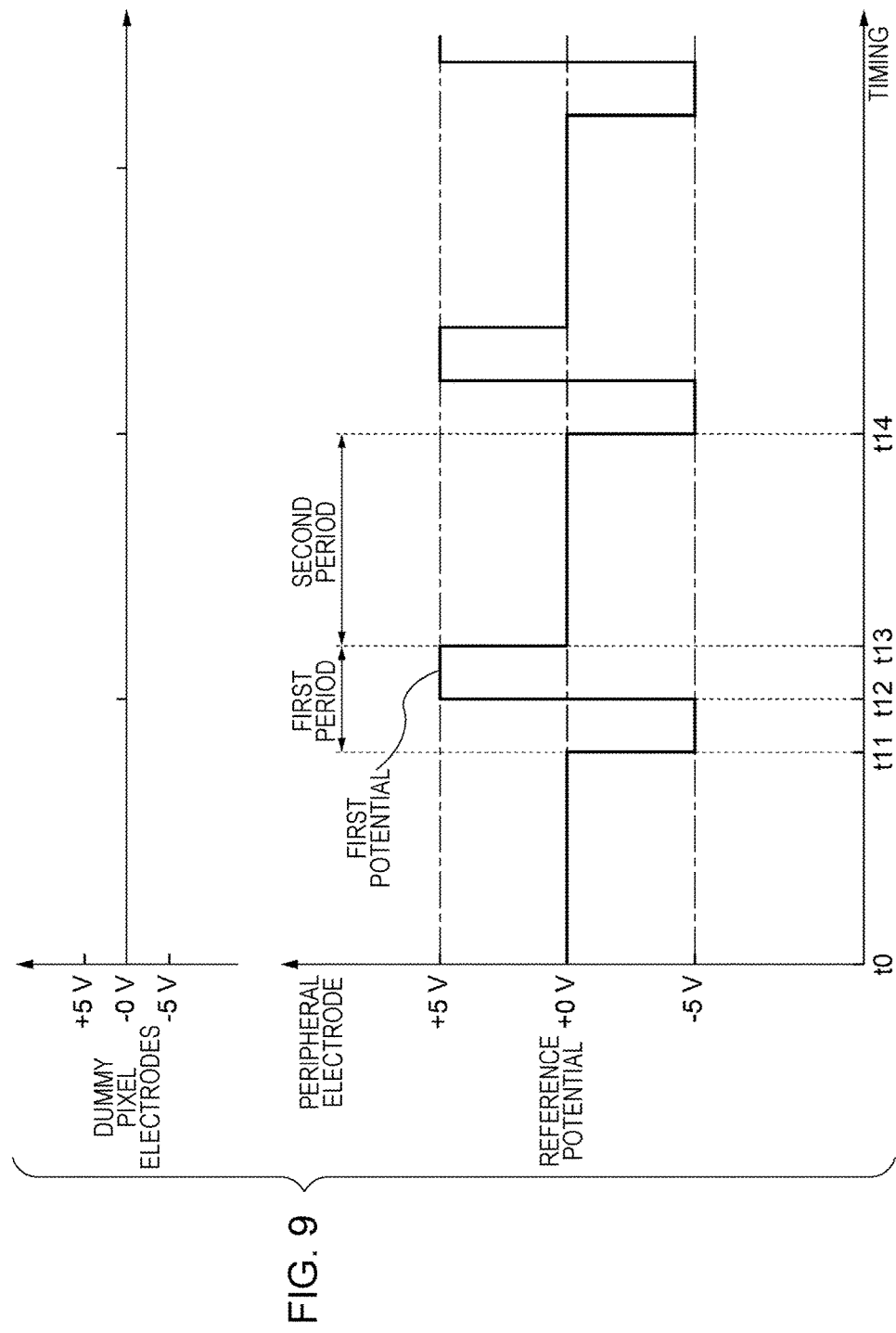
FIG. 9 is a timing chart which shows a waveform of a signal applied to a peripheral electrode and dummy pixel electrodes.

FIG. 9 is a timing chart which shows a waveform of a signal which is applied to a peripheral electrode and dummy pixel electrodes. The horizontal axis represents time and the vertical axis represents potential. Taking an example of a specific signal which is applied to the peripheral electrode 130, description will be given of the method for driving the liquid crystal apparatus 100 with reference to FIG. 9.

As shown in FIG. 9, the method for driving the liquid crystal apparatus 100 according to the present embodiment sets the common electrode 23 and the reference potential to, for example, 0 V, and applies a potential (for example, 0 V) which is the same as the potential of the common electrode 23 to the dummy pixel electrodes 15d in the display period for driving the pixel electrodes 15.

A signal, which is an alternating potential which inverts the polarity centering on the reference potential in the first period and which is a reference potential in the second period, is applied to the peripheral electrode 130. In other words, the alternating potential is applied to the peripheral electrode 130 after a period in which the reference potential is applied.

Detailed description will be given of the signal which is applied to the peripheral electrode 130. As shown in FIG. 9, it is assumed that the power of the liquid crystal apparatus 100 is turned on at a timing t0. The potential of the peripheral electrode 130 (referred to below as the first potential) transitions from the reference potential (0 V) to a low potential (−5 V) at a timing t11 and is constant at the low potential (−5 V) from the timing t11 to a timing t12.

After that, the first potential transitions from the low potential (−5 V) to a high potential (+5 V) at the timing t12 and is constant at the high potential (+5 V) from the timing t12 up to a timing t13.

After that, the first potential transitions from the high potential (+5 V) to the reference potential (0 V) at the timing t13 and is constant at the reference potential (0 V) from the timing t13 up to a timing t14. In other words, from the timing t11 up to the timing t14 is one period for the signal which is applied to the peripheral electrode 130 and this period is subsequently repeated.

The signal applied to the peripheral electrode 130 of the present embodiment is periodic and the reference potential and the alternating potential are alternately repeated; however, the signal need not be periodic and the reference potential and the alternating potential need not alternately repeated.

In addition, the settings of the square wave reference potential, the high potential, and the low potential applied to the peripheral electrode 130 and the settings of the potential applied to the dummy pixel electrodes 15d are not limited thereto.

In the period in which the first potential is an alternating potential, in other words, in one period of the signal applied to the peripheral electrode 130, for example, the period from the timing t11 to the timing t13 is referred to as the first period.

In the period in which the first potential is the reference potential (0 V), in other words, in one period of the signal applied to the peripheral electrode 130, for example, the period from the timing t13 to the timing t14 is referred to as second period.

since making the first period in which the alternating potential is applied shorter than the second period in which the reference potential is applied to the peripheral electrode 130 in one period of the signal applied to the peripheral electrode 130 makes it possible to ensure sufficient time for the return the liquid crystal molecules LC to the initial alignment state, it is possible to form a strong liquid crystal flow in comparison with a case where the first period and the second period are equal or the first period is longer than the second period.

In addition, in one period of a signal applied to the peripheral electrode 130, the period in which the alternating potential is applied, that is, the period from the timing t11 up to t13 is preferably 1 msec or more to 100 msec or less.

This is because, when the period in which the alternating potential is applied (the period from the timing t11 up to t13) is excessively long, this leads to a state where the same potential as the direct current is applied to the peripheral electrode 130 for a long period and there is a concern that defects such as, for example, liquid crystal decomposition, burn-in, or display stains will occur.

On the other hand, this is because, when the period in which the alternating potential is applied is excessively short, the generated liquid crystal flow is reduced and there is a concern that the movement of the ionic impurities in the liquid crystal layer 50 will not be efficiently performed.

In addition, when the interval in which the alternating potential is applied is excessively long, the number of changes in the alignment of the liquid crystal is reduced, the generated liquid crystal flow is reduced, and it is not easy to efficiently move the ionic impurities in the liquid crystal layer 50.

On the other hand, when the interval in which the alternating potential is applied is excessively short, the liquid crystal flow is not easily generated since the response of the liquid crystal will not be able to keep up and changes in the alignment of the liquid crystal do not easily occur.

For example, the response speed of the TN liquid crystal is 3.2 msec in a case where the applied potential changes from the reference potential (0 V) to the high potential (+5 V) and is 13.3 msec in a case where the applied potential changes from the high potential (+5 V) to the reference potential (0 V).

In addition, the response speed of the VA liquid crystal is 6.5 msec in a case where the applied potential changes from the reference potential (0 V) to the high potential (+5 V) and is 6.9 msec in a case where the applied potential changes from the high potential (+5 V) to the reference potential (0 V).

In this manner, the response speeds of the various types of liquid crystals need not completely match in order to reliably sweep the ionic impurities to the peripheral electrode 130; however, the waveform of the signal which is applied to the peripheral electrode 130, for example, the amplitude and the period of the alternating potential are preferably determined to match the response speed of the type of liquid crystal.

In addition, the potential difference between the reference potential and the alternating potential (the high potential or the low potential) is preferably 0.5 V or more. This is because, in order to efficiently move the ionic impurities, it is necessary to increase the liquid crystal flow and, for this reason, it is better to increase the changes in the alignment of the liquid crystal as much as possible.

Since the liquid crystal alignment state has a relationship with the voltage which is applied to the electrode, it is preferable to apply a signal with as large a potential difference as possible to the peripheral electrode 130. In the present embodiment, the potential difference between the reference potential and the alternating potential is 5 V.

In addition, in order to sweep the ionic impurities farther from the display region E, it is preferable to increase the number n of the peripheral electrodes 130. In a case where there is a plurality of peripheral electrodes 130, the width of the peripheral electrodes arranged on the outermost periphery seen from the display region E is preferably larger than the width of the other peripheral electrodes in the direction from the outer edge of the display region E to the outside of the display region E.

In addition, the signal which is applied to the peripheral electrode 130 is not limited to a square wave and, within the period of one period, may be a sine wave or a triangular wave where the phases are different to each other. Here, it is possible to simplify the circuit configuration more with a digital circuit which generates a square wave than with an analog circuit which generates an analog signal such as a sine wave.

In addition, the maximum potential on the positive polarity side (the high potential side) and the maximum potential on the negative polarity side (the low potential side) need not necessarily be the same with respect to the size of the amplitude of the signal which is applied to the peripheral electrode 130, in other words, the reference potential (for example, 0 V). Specifically, a signal which is amplified between the high potential side 6 V and the low potential side −4 V may be applied to the peripheral electrode 130 with 0 V as the reference potential.

Peripheral Electrode

Figure 10:
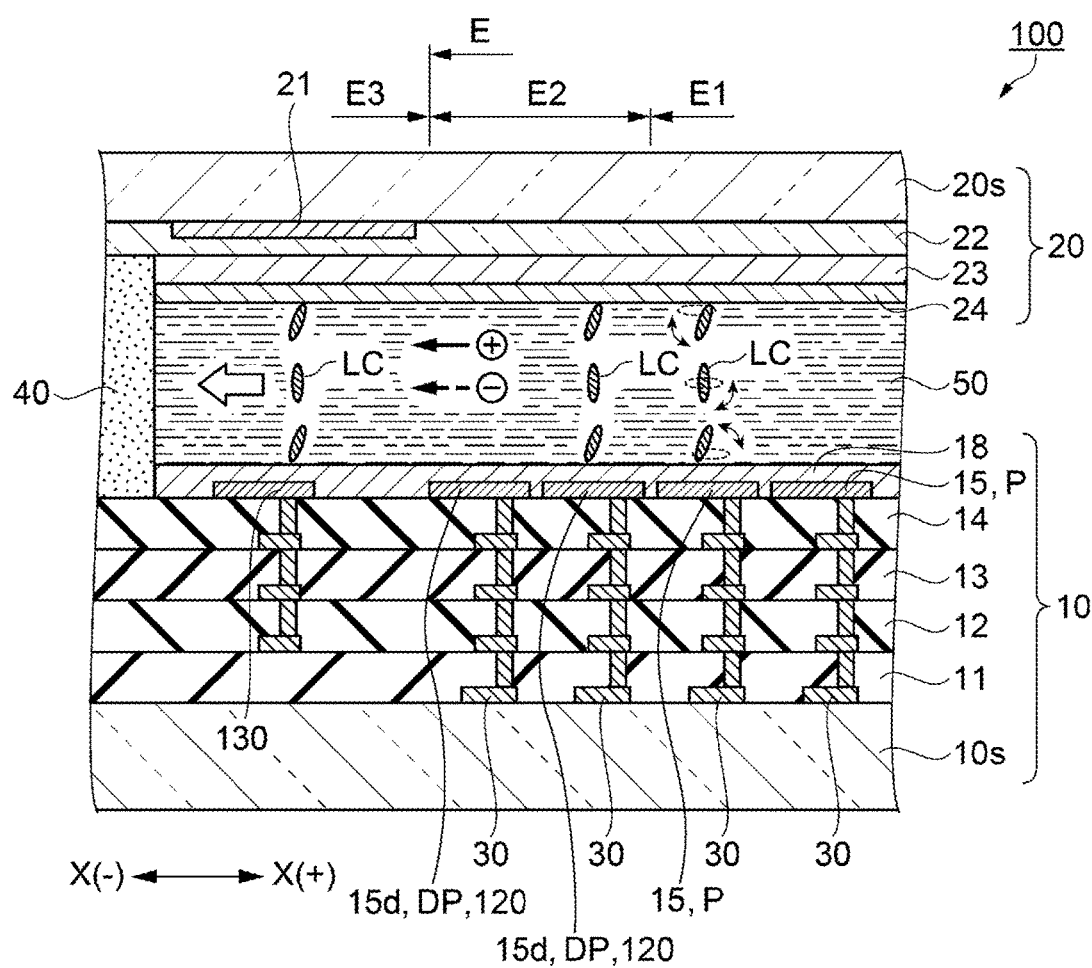
FIG. 10 is a cross-sectional diagram of main sections which shows a structure of an ion sweeping mechanism of a liquid crystal apparatus taken along line X-X in FIG. 7.

FIG. 10 is a cross-sectional diagram of main sections which shows the structure of an ion sweeping mechanism of the liquid crystal apparatus taken along line X-X of FIG. 7. As shown in FIG. 10, the element substrate 10 of the liquid crystal apparatus 100 has a plurality of wiring layer 11 to wiring layer 14 on the base material 10s. The pixel electrodes 15 of the pixels P, the dummy pixel electrodes 15d of the dummy pixels DP (the electric parting section 120), and the peripheral electrode 130 are formed on the wiring layer 14.

The common electrode 23 is provided on the counter substrate 20 so as to oppose the plurality of the pixel electrodes 15 and the dummy pixel electrodes 15d in the display region E.

The dummy pixel electrodes 15d and the peripheral electrode 130 are formed using the same transparent conductive film as the pixel electrodes 15, for example, an ITO film, in the step for forming the pixel electrodes 15. The planar shape and size and the arrangement pitch of the dummy pixel electrodes 15d is the same as for the pixel electrodes 15.

The peripheral electrode 130 is arranged in both the X axis direction and the Y axis direction and is connected with the wiring provided on the lower layer of the wiring layers 11 to 13 and led out to the external connection terminal 104 (refer to FIG. 8).

The dummy pixel electrodes 15d are electrically connected with the TFT 30 provided on the wiring layer 11. In a case where the liquid crystal apparatus 100 is a normally black mode, since the electric parting section 120 is normally set to the "black mode" regardless of the display state of the pixels P of the actual display region E1, for example, a potential which does not change the transmittance of the dummy pixels DP is applied to the plurality of dummy pixel electrodes 15d via the TFT 30.

Flow of Liquid Crystal Molecules

As shown in FIG. 10, by driving the liquid crystal layer 50, a voltage is applied to the liquid crystal molecules LC, activity (vibration) is generated in the liquid crystal molecules LC, and the alignment periodically changes. In the vicinity of the interface between the liquid crystal layer 50 and the alignment films 18 and 24, the flow of the liquid crystal molecules LC is generated.

In a case where the liquid crystal molecules LC change from the vertical alignment to a horizontal alignment, the liquid crystal molecules LC rotate to the right and, in a case where the pixel electrodes 15 are arranged on the element substrate 10 side with respect to the liquid crystal layer 50, the liquid crystal flow is generated in the left direction (the −X axis direction). In addition, in a case where the liquid crystal molecules LC change from the horizontal alignment to the vertical alignment, the liquid crystal flow is generated in the right direction (the +X axis direction).

In comparison with the torque generated in the liquid crystal molecules LC when the liquid crystal molecules LC change from the horizontal alignment to the vertical alignment, the torque generated in the liquid crystal molecules LC is larger when the liquid crystal molecules LC change from the vertical alignment to the horizontal alignment. Therefore, by repeating the alignment changes of the liquid crystal molecules LC, the ionic impurities are moved in the left direction (−X axis direction).

When the insulation resistance of the liquid crystal layer 50 is decreased in the pixels P positioned around the corner sections 45 of the display region E due to the movement of the ionic impurities, this leads to a decrease in the driving potential in the pixels P and the display unevenness or the burn-in phenomenon due to the energization is remarkable. In particular, in a case where inorganic alignment films are used in the alignment films 18 and 24, since inorganic alignment films easily adsorb the ionic impurities, the display unevenness or the burn-in phenomenon is conspicuous in comparison with that of organic alignment films.

In addition, a signal, which is an alternating potential which inverts the polarity centering on the reference potential in the first period and which is a reference potential in the second period, is applied to the peripheral electrode 130 of the liquid crystal apparatus 100 of the present embodiment as illustrated in FIG. 9.

Therefore, even in the liquid crystal layer 50 of the parting region E3 in which the peripheral electrode 130 is provided, generating a liquid crystal flow in accordance with alignment changes in the liquid crystal molecules LC makes it possible to move the ionic impurities in the display region E to the parting region E3 in which the peripheral electrode 130 is provided. The rate of the flow is considered to depend on the frequency of the driving signal which drives the pixels P.

From the above, the following effects are obtained by the liquid crystal apparatus 100 according to the first embodiment described above.

(1) By generating the liquid crystal flow in accordance with alignment changes in the liquid crystal molecules LC in the liquid crystal layer 50 of the parting region E3 in which the peripheral electrode 130 is provided, the ionic impurities in the display region E are moved to the parting region E3 in which the peripheral electrode 130 is provided. Therefore, for example, even in a case where a dummy pixel region E2 to which an alternating potential is not applied such as the electric parting section 120 is arranged in the display region E in the liquid crystal apparatus 100, it is possible to move the ionic impurities from the display region E to the outside of the display region E regardless of the polarity of the ionic impurities. Accordingly, it is possible to reduce the influence of burn-in or the like caused by the ionic impurities included in the liquid crystal layer 50 on the display.

(2) Since the signal applied to the peripheral electrode 130 is periodic, it is possible to sweep the ionic impurities from the display region E to the outside of the display region E by periodically generating a liquid crystal flow in accordance with alignment changes in the liquid crystal molecules LC.

(3) Since the electric parting section 120 provided to surround the pixel electrodes 15 is provided in the display region E, by providing the electric parting section 120 between the actual display region E1 and the peripheral electrode 130, it is possible to reduce the influence of the ionic impurities moved to the parting region E3 in which the peripheral electrode 130 is provided, on the actual display region E1.

(4) Since the reference potential is the same potential as the potential (LCCOM) of the common electrode 23, it is possible to suppress the application of the direct current voltage to the liquid crystal layer 50 due to the potential difference between the peripheral electrode 130 and the common electrode 23. Therefore, it is possible to reduce the deterioration of the liquid crystal layer 50.

(5) Since the second period in which the alternating potential is applied to the peripheral electrode 130 is 1 msec or more to 100 msec or less, it is possible to change the potential applied to the peripheral electrode 130 to match the response speed of the liquid crystal. Accordingly, it is possible to reliably form the liquid crystal flow in the parting region E3 in which the peripheral electrode 130 is provided.

(6) Since the potential difference between the reference potential and the alternating potential applied to the peripheral electrode 130 is 0.5 V or more, the alignment changes in the liquid crystal are increased in comparison with a case where the potential difference between the reference potential and the alternating potential is less than 0.5 V, thus it is possible to form a stronger liquid crystal flow. Therefore, it is possible to efficiently sweep the ionic impurities from the display region E to the outside of the display region E.

Second Embodiment

Method for Driving Liquid Crystal Apparatus

Figure 11:
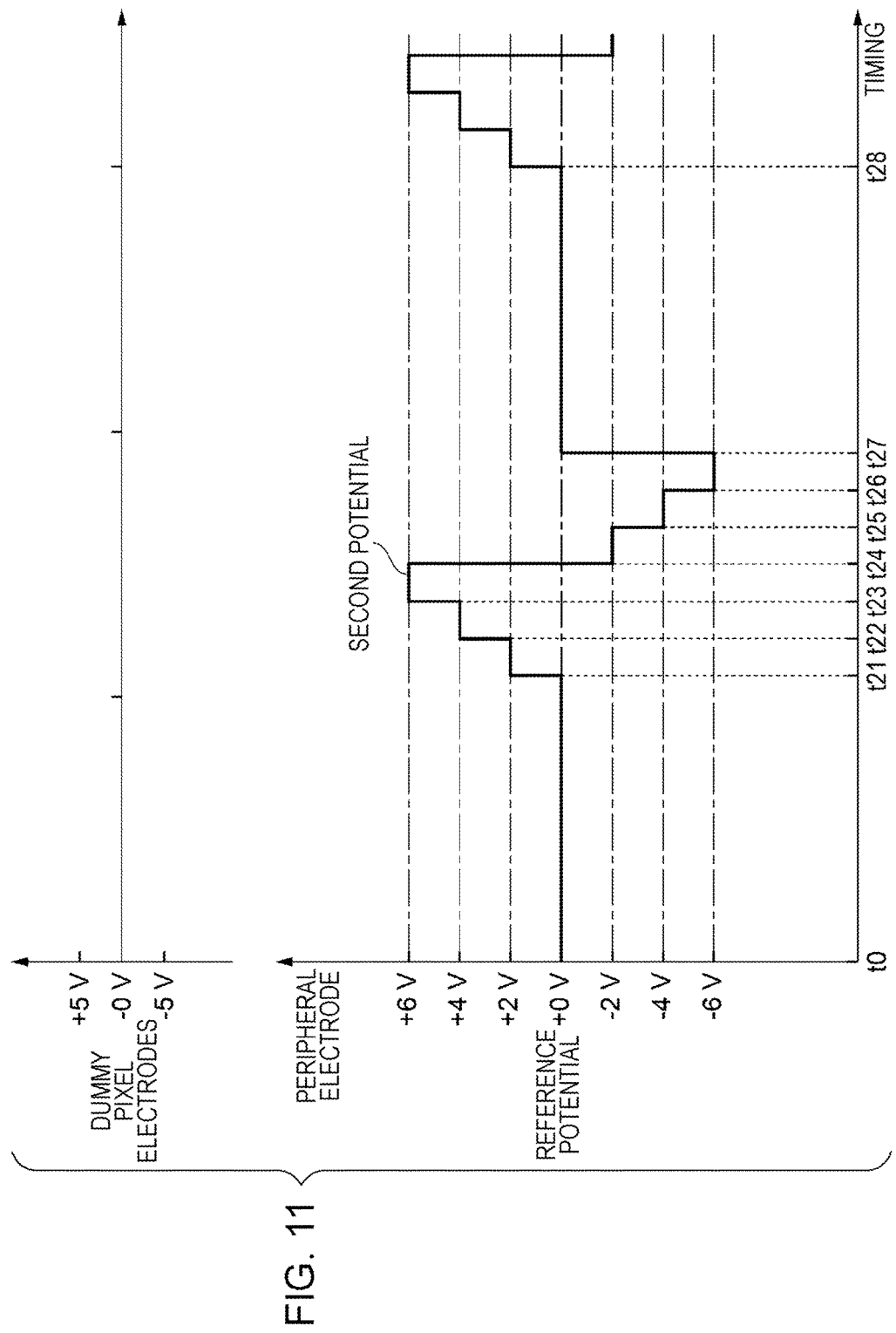
FIG. 11 is a timing chart which shows a waveform of a signal applied to the peripheral electrode and dummy pixel electrodes according to a second embodiment.

FIG. 11 is a timing chart which shows a waveform of a signal applied to the peripheral electrode and the dummy pixel electrodes according to the second embodiment. The horizontal axis represents time and the vertical axis represents potential.

When compared with the liquid crystal apparatus 100 according to the first embodiment, the liquid crystal apparatus 100 according to the present embodiment is different in the method for driving the liquid crystal. The same reference numerals are applied to the portions common with the first embodiment described above and description thereof will be omitted and description will be given focusing on the portions which are different from the first embodiment described above.

In the method for driving the liquid crystal apparatus 100 according to the present embodiment, the potential of the signal applied to the peripheral electrode 130 is an alternating potential which transitions between a low potential (−6 V) and a high potential (+6 V) and transitions in stages between three different potential values over time with 0 V set as the reference potential.

Specifically, as shown in FIG. 11, it is assumed that the power of the liquid crystal apparatus 100 is turned on at the timing t0.

The potential of the peripheral electrode 130 (referred to below as the second potential) is constant at the reference potential (0 V) from the timing t0 to a timing t21 and transitions from the reference potential (0 V) up to the first high potential (+2 V) at the timing t21.

After that, the second potential is constant at the first high potential (+2 V) from the timing t21 up to a timing t22 and transitions from the first high potential (+2 V) to the second high potential (+4 V) at the timing t22.

After that, the second potential is constant at the second high potential (+4 V) from the timing t22 up to a timing t23 and transitions from the second high potential (+4 V) to the third high potential (+6 V) at the timing t23.

After that, the second potential is constant at the third high potential (+6 V) from the timing t23 up to a timing t24 and transitions from the third high potential (+6 V) to the first low potential (−2 V) at the timing t24.

After that, the second potential is constant at the first low potential (−2 V) from the timing t24 up to a timing t25 and transitions from the first low potential (−2 V) to the second low potential (−4 V) at the timing t25.

After that, the second potential is constant at the second low potential (−4 V) from the timing t25 up to a timing t26 and transitions from the second low potential (−4 V) to the third low potential (−6 V) at the timing t26.

After that, the second potential is constant at the third low potential (−6 V) from the timing t26 up to a timing t27, transitions from the third low potential (−6 V) to the reference potential (0 V) at the timing t27, and is constant at the reference potential (0 V) from the timing t27 up to a timing t28. In other words, from the timing t21 up to the timing t28 is one period of the signal applied to the peripheral electrode 130 and this period is subsequently repeated.

In this manner, since the electric field generated in the peripheral electrode 130 is smooth, the alternating potential easily matches the response of the liquid crystal molecules LC. Therefore, it is possible to smoothly move the ionic impurities.

In FIG. 11, the second potential is a first high potential (+2 V) from the timing t21 to the timing t22, a second high potential (+4 V) from the timing t22 to the timing t23, a third high potential (+6 V) from the timing t23 to the timing t24, a first low potential (−2 V) from the timing t24 to the timing t25, a second low potential (−4 V) from the timing t25 to the timing t26, a third low potential (−6 V) from the timing t26 to the timing t27; however, none of these potentials is limited thereto.

Third Embodiment

Method for Driving Liquid Crystal Apparatus

Figure 12:
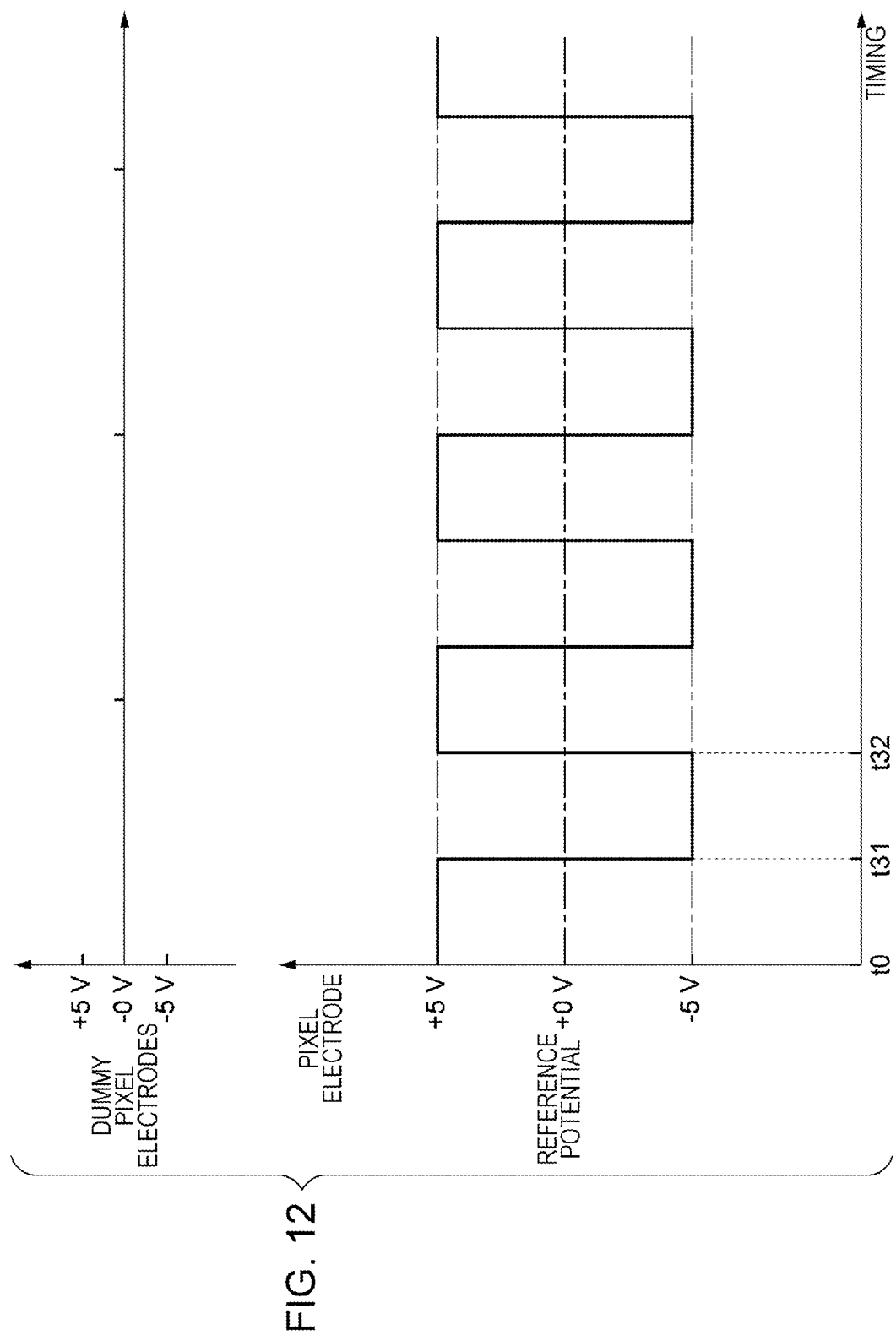
FIG. 12 is a timing chart which shows a waveform of a signal applied to pixel electrodes of a liquid crystal layer.
Figure 13:
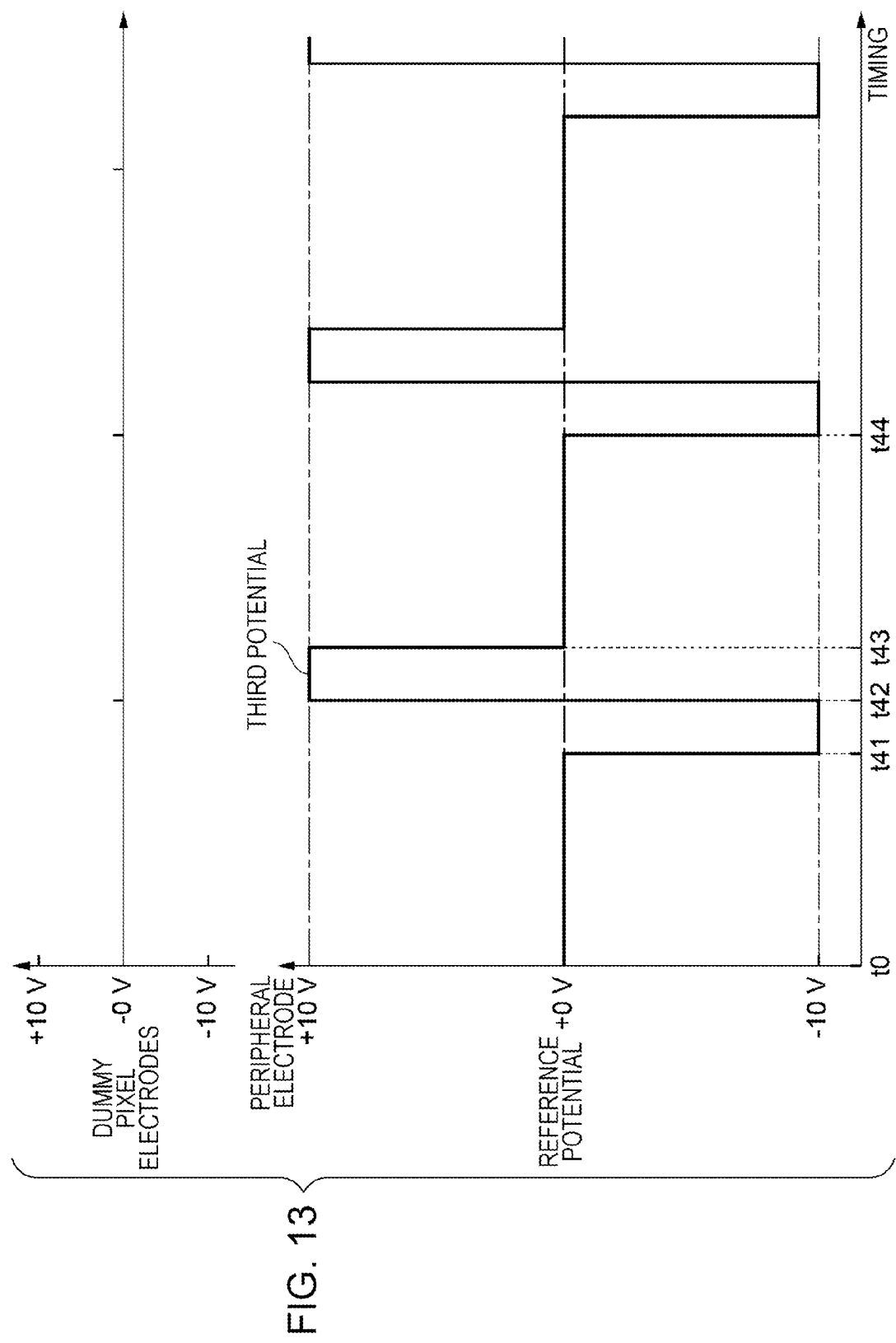
FIG. 13 is a timing chart which shows a waveform of a signal applied to a peripheral electrode and dummy pixel electrodes according to a third embodiment.

FIG. 12 is a timing chart which shows a waveform of a signal applied to the pixel electrode of the liquid crystal layer. FIG. 13 is a timing chart which shows a waveform of a signal applied to the peripheral electrode and the dummy pixel electrodes according to the third embodiment. The horizontal axis represents time and the vertical axis represents potential.

When compared to the liquid crystal apparatus 100 according to the first embodiment described above, the liquid crystal apparatus 100 according to the present embodiment is different in the method for driving the liquid crystal. The same reference numerals are applied to the portions common with the embodiments described above and description thereof will be omitted and description will be given focusing on the portions which are different from the embodiments described above.

In the method for driving the liquid crystal apparatus 100 according to the present embodiment, the amplitude (20 V) of the alternating potential of the signal applied to the peripheral electrode 130 is greater than the amplitude (10 V) of the potential of the signal applied to the pixel electrodes 15.

First, detailed description will be given of the signal applied to the pixel electrodes 15 according to the third embodiment. As shown in FIG. 12, regarding the signal applied to the pixel electrodes 15, when the pixel electrodes 15 are in an on state, the potential of the pixel electrodes 15 is constant at the high potential (+5 V) from the timing t0 up to a timing t31 and transitions from the high potential (+5 V) to the low potential (−5 V) at the timing t31.

After that, the potential of the pixel electrodes 15 is constant at the low potential (−5 V) from the timing t31 up to a timing t32 and transitions from the low potential (−5 V) to the high potential (+5 V) at the timing t32.

In other words, from the timing t0 up to the timing t32 is one period of the signal applied to the pixel electrodes 15, and this period is subsequently repeated.

Next, detailed description will be given of the signal applied to the peripheral electrode 130 according to the third embodiment. As shown in FIG. 13, when the power of the liquid crystal apparatus 100 is turned on at the timing t0, the potential (referred to below as the third potential) of the peripheral electrode 130 is constant at the reference potential (0 V) from the timing t0 up to a timing t41 and transitions from the reference potential (0 V) to a negative polarity (low potential, −10 V) at the timing t41.

After that, the third potential is constant at a low potential (−10 V) from the timing t41 up to a timing t42 and transitions from the low potential (−10 V) to a high potential (+10 V) at the timing t42.

After that, the third potential is constant at the high potential (+10 V) from the timing t42 up to a timing t43 and transitions from the high potential (+10 V) to the reference potential (0 V) at the timing t43.

After that, the third potential is constant at the reference potential (0 V) from the timing t43 up to a timing t44. In other words, from the timing t41 to the timing t44 is one period of the signal applied to the peripheral electrode 130, and this period is subsequently repeated.

In FIG. 12, from the timing t0 to the timing t31 is a high potential +5 V and from the timing t31 to the timing t32 is a low potential −5 V; however, neither of these potentials is limited thereto.

In addition, in FIG. 13, from the timing t41 to the timing t42 is a low potential −10 V and from the timing t42 to the timing t43 is a high potential +10 V; however, neither of these potentials is limited thereto.

In order to efficiently move the ions, it is necessary to increase the liquid crystal flow. Therefore, it is preferable if the alignment changes in the liquid crystal are as large as possible. Since the liquid crystal alignment state is determined by the voltage applied to the electrodes, it is preferable to apply as large a potential as possible to the peripheral electrode 130.

In the present embodiment, it is possible to increase the speed of the alignment changes in the liquid crystal molecules LC since the amplitude of the alternating potential of the signal applied to the peripheral electrodes 130 is greater than the amplitude of the potential of the signal applied to the pixel electrodes 15. Therefore, it is possible to form a larger liquid crystal flow by generating a high torque in the liquid crystal molecules LC. As a result, it is possible to efficiently sweep the ionic impurities from the display region E to the outside of the display region E.

Fourth Embodiment

Electronic Equipment

Figure 14:
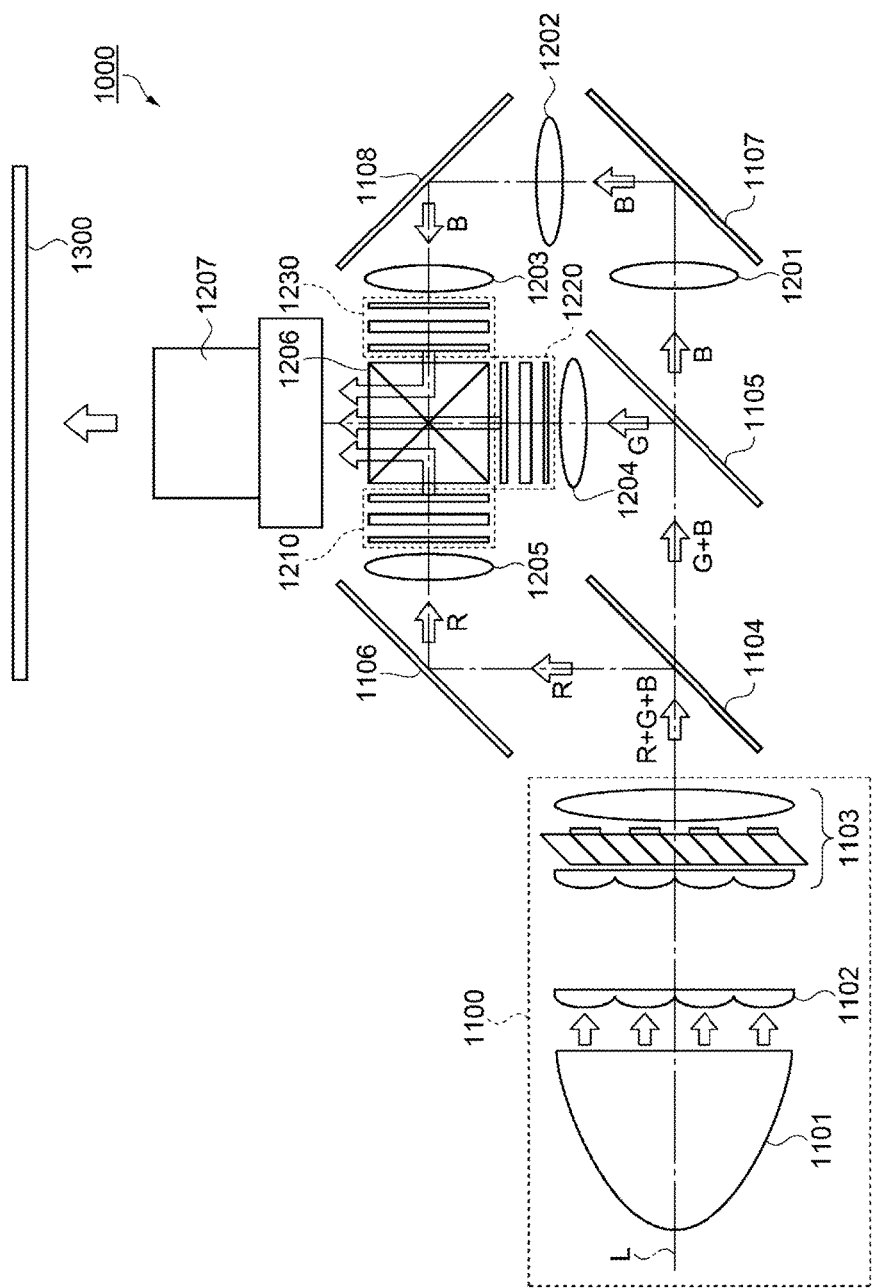
FIG. 14 is a schematic diagram which shows a configuration of a projection-type display apparatus as electronic equipment according to a fourth embodiment.

Next, description will be given of a projection-type display apparatus as the electronic equipment according to the fourth embodiment with reference to FIG. 14. FIG. 14 is a schematic diagram which shows a configuration of a projection-type display apparatus as the electronic equipment according to the fourth embodiment.

As shown in FIG. 14, a projection-type display apparatus 1000 as the electronic equipment according to the present embodiment is provided with a polarization illumination apparatus 1100 arranged along a system optical axis L, two dichroic mirrors 1104 and 1105 as light splitting elements, three reflecting mirrors 1106, 1107, and 1108, five relay lenses 1201, 1202, 1203, 1204, and 1205, three transmission-type liquid crystal light valves 1210, 1220, and 1230 as a light modulation means, a cross dichroic prism 1206 as a photosynthesis element, and a projection lens 1207.

The polarization illumination apparatus 1100 is configured to include a lamp unit 1101 as a light source composed of a white light source such as an ultrahigh pressure mercury lamp or a halogen lamp, an integrator lens 1102, and a polarization conversion element 1103.

The dichroic mirror 1104 reflects red light (R) and transmits green light (G) and blue light (B) from within the polarized light beams emitted from the polarization illumination apparatus 1100. Another dichroic mirror 1105 reflects the green light (G) transmitted by the dichroic mirror 1104 and transmits the blue light (B).

The red light (R) reflected by the dichroic mirror 1104 is incident to the liquid crystal light valve 1210 via a relay lens 1205 after being reflected by the reflecting mirror 1106.

The green light (G) reflected by the dichroic mirror 1105 is incident to the liquid crystal light valve 1220 via a relay lens 1204.

The blue light (B) transmitted through the dichroic mirror 1105 is incident to the liquid crystal light valve 1230 via a light guide system composed of three relay lenses 1201, 1202, and 1203 and two reflecting mirrors 1107 and 1108.

The liquid crystal light valves 1210, 1220, and 1230 are each arranged to oppose the incident surface for each color light of the cross dichroic prism 1206. The color light incident to the liquid crystal light valves 1210, 1220, and 1230 is modulated based on image information (image signals) and emitted toward the cross dichroic prism 1206.

In this prism, four rectangular prisms are bonded with each other and, on the inner surfaces thereof, a dielectric multilayer film for reflecting red light and a dielectric multilayer film for reflecting blue light are formed in a cross-shape. Light representing a color image is synthesized by synthesizing three colors of light with these dielectric multilayer films.

The synthesized light is projected on a screen 1300 by the projection lens 1207 which is a projection optical system and the image is enlarged and displayed.

The liquid crystal light valve 1210 is applied to the liquid crystal apparatus 100 having the peripheral electrode 130 described above. A pair of polarizing elements with a crossed Nicols arrangement is arranged with a gap on the color light incident side and the emission side of the liquid crystal panel 110. The other liquid crystal light valves 1220 and 1230 are also similar.

Since the projection-type display apparatus 1000 is provided with the liquid crystal apparatus 100 described from the first embodiment to the third embodiment described above as the liquid crystal light valves 1210, 1220, and 1230, the display defects such as burn-in and the like caused by ionic impurities included in the liquid crystal layer 50 are improved and it is possible to project an image with an excellent display quality.

The invention is not limited to the embodiments described above and can be appropriately modified without departing from the gist or spirit of the invention read from claims and the entire specification, and the liquid crystal apparatus changed in this manner and the electronic equipment to which this liquid crystal apparatus is applied are also included in the technical range of the invention. Various modification examples other than the embodiments described above will be considered. Description will be given below of these modification examples.

Modification Example 1

Without being limited to a VA system, the liquid crystal apparatus 100 according to the embodiments described above to which the peripheral electrode 130 is applicable can also be applied to an in-plane switching (IPS) system, fringe field switching (FFS) system, or optically compensated birefringence (OCB) system.

In addition, the liquid crystal apparatus described in the embodiments described above is not limited to a transmissive-type, projection-type display apparatus 1000 as the electronic equipment described in the fourth embodiment, and can also be applied to a reflective-type display apparatus. In a case where the liquid crystal apparatus described in the embodiments described above is applied to a reflective-type display apparatus, the pixel electrodes 15 may be formed using Al or an alloy including Al, which has a light reflecting property.

According to such a reflection type display apparatus, since the reflective-type liquid crystal apparatus is used in a liquid crystal light valve, it is possible to provide a reflective-type, projection-type display apparatus having an excellent display quality which is able to project a bright image and for which display defects caused by ionic impurities are improved.

Modification Example 2

In addition, the electronic equipment to which the liquid crystal apparatus described in the embodiments and modification examples above is applicable is not limited to the projection-type display apparatus 1000 described in the fourth embodiment described above.

For example, the liquid crystal apparatus described in the embodiments and modification examples described above can be suitably used as the display section of electronic equipment such as a projection-type head-up display (HUD) or a direct-view-type head mounted display (HMD), an E-book reader, a personal computer, a digital still camera, a liquid crystal television, a view finder-type or monitor direct-view-type video recorder, a car navigation system, an electronic organizer, and a POS.

The entire disclosure of Japanese Patent Application No. 2015-215495, filed Nov. 2, 2015 is expressly incorporated by reference herein.

What is claimed is:
1. A liquid crystal apparatus comprising:
a first substrate and a second substrate which are arranged opposite to each other and bonded with sealing material;
a liquid crystal layer interposed between the first substrate and the second substrate;
a pixel electrode provided in a display region of the first substrate;
a counter electrode provided to oppose the pixel electrode in the second substrate; and
a peripheral electrode provided in the first substrate between the display region and the sealing material in plan view,
wherein
a signal is applied to the peripheral electrode,
in a first period, the signal applied to the peripheral electrode is an alternating potential which inverts a polarity with respect to a reference potential,
in a second period following the first period, the signal applied to the peripheral electrode includes only a constant potential and remains at the constant potential for the duration of the second period,
the constant potential is the reference potential, and
the second period is longer than the first period.
2. The liquid crystal apparatus according to claim 1, wherein the signal is periodically applied.

3. The liquid crystal apparatus according to claim 1, wherein the first period is shorter than the second period.

4. The liquid crystal apparatus according to claim 1, wherein the first substrate is provided with an electric parting section provided so as to surround the pixel electrodes.

5. The liquid crystal apparatus according to claim 1, wherein the reference potential is the same potential as a potential of the counter electrode.

6. The liquid crystal apparatus according to claim 1, wherein the first period is 1 msec or more to 100 msec or less.

7. The liquid crystal apparatus according to claim 1, wherein a potential difference between the reference potential and the alternating potential is 0.5 V or more.

8. The liquid crystal apparatus according to claim 1, wherein an amplitude of the alternating potential is greater than an amplitude of the potential applied to the pixel electrodes.

9. The liquid crystal apparatus according to claim 1, wherein the alternating potential changes stepwise between three or more values over time.

10. Electronic equipment comprising:
the liquid crystal apparatus according to claim 1.

11. Electronic equipment comprising:
the liquid crystal apparatus according to claim 2.

12. Electronic equipment comprising:
the liquid crystal apparatus according to claim 3.

13. Electronic equipment comprising:
the liquid crystal apparatus according to claim 4.

14. Electronic equipment comprising:
the liquid crystal apparatus according to claim 5.

15. Electronic equipment comprising:
the liquid crystal apparatus according to claim 6.

16. Electronic equipment comprising:
the liquid crystal apparatus according to claim 7.

17. Electronic equipment comprising:
the liquid crystal apparatus according to claim 8.

18. Electronic equipment comprising:
the liquid crystal apparatus according to claim 9.

19. A method for driving a liquid crystal apparatus including a first substrate and a second substrate which are arranged opposite to each other and bonded with sealing material, a liquid crystal layer interposed between the first substrate and the second substrate, a pixel electrode provided in a display region of the first substrate, a counter electrode provided to oppose the pixel electrode in the second substrate, and a peripheral electrode provided in the first substrate between the display region and the sealing material in plan view, the method comprising:

applying a first signal to the peripheral electrode in a first period, where the first signal is an alternating potential which inverts a polarity with respect to a reference potential; and applying a second signal to the peripheral electrode in a second period following the first period, where the second signal includes only a constant potential and remains at the constant potential for the duration of the second period, wherein the constant potential is the reference potential, and the second period is longer than the first period.

20. The method for driving a liquid crystal apparatus according to claim 19, wherein the first period is 1 msec or more.

* * * * *